United States Patent [19]
Molby

[11] 3,837,672
[45] Sept. 24, 1974

[54] TRACTOR AND MUD FLAP THEREFOR

[75] Inventor: Lloyd A. Molby, Longview, Tex.

[73] Assignee: Capacity, Inc., Downers Grove, Ill.

[22] Filed: Oct. 19, 1972

[21] Appl. No.: 299,108

[52] U.S. Cl............................................ 280/154.5 R
[51] Int. Cl............................................ B62d 25/16
[58] Field of Search.......... 280/154.5 R, 438 R, 833

[56] References Cited
UNITED STATES PATENTS
2,679,403   5/1954   Howard........................ 280/154.5 R
3,380,758   4/1968   Granning...................... 280/438 R

*Primary Examiner*—Robert R. Song
*Attorney, Agent, or Firm*—Hofgren, Wegner, Allen, Stellman & McCord

[57]  ABSTRACT

An improved mud flap system for prime movers such as tractors employed in towing trailers. The mud flap is mounted for up and down movement on the prime mover frame and in a location forwardly of the drive wheels thereof so that the same can be selectively elevated when a trailer is not being towed by the prime mover to intercept mud thrown forwardly of the drive wheels off of the upper surface thereof.

6 Claims, 2 Drawing Figures

PATENTED SEP 24 1974

3,837,672

TRACTOR AND MUD FLAP THEREFOR

BACKGROUND OF THE INVENTION

This invention relates to prime movers such as tractors employed for pulling trailers and, more particularly, to improved mud flap systems to be employed therewith.

Mud flaps have long been employed in connection with trailers or trucks, principally for precluding road debris such as mud being thrown rearwardly of the vehicle when the vehicle is in transit onto following vehicles and for most purposes, such a use is sufficient. However, in the case of tractors that are not connected to trailers, mud protection for the prime mover itself is desired.

Specifically, when a trailer is affixed to the fifth wheel of a typical tractor, the forward end of its underside overlies and will be forwardly of the drive wheels of the tractor. In such a case, much of the mud kicked up by the drive wheel will be intercepted by the undersurface of the trailer. However, when the trailer is absent, no such interception takes place and the mud may be thrown forwardly to strike against the rear of the cab of the tractor.

The problem is aggravated with so-called "spotting tractors." Tractors normally employed for over-the-road hauling only occasionally encounter rough or muddy roads while not towing a load, thereby minimizing the problem. But spotting tractors are typically employed to move trailers from one position to another in a loading or storage area and approximately half the time are not connected to a trailer. Moreover, such facilities quite frequently are in a lesser state of repair than modern highways with the result that there is a greater likelihood that muddy areas will be encountered. Thus, the increased chances of encountering mud along with the increased usage without connection to a trailer, significantly compounds the mud problem with spotting tractors.

SUMMARY OF THE INVENTION

It is the principal object of the invention to provide a new and improved means for precluding mud kicked up by the drive wheels of a tractor from being thrown forwardly to impinge against the cab thereof when the tractor is not towing a trailer. More particularly, it is an object of the invention to provide mud flaps just forwardly of the drive wheels of the tractor, which flaps can be vertically moved to positions designed to intercept mud thrown forwardly by the drive wheels.

The exemplary embodiment of the invention achieves the foregoing objects in a spotting tractor of the type having a main vehicle frame with rear drive wheels thereon. The frame also pivotally mounts a subframe to which the fifth wheel of the tractor is affixed. Just forwardly of the rear wheel and secured to the subframe is a pair of mud flaps in a vertical orientation.

The height of the mud flaps can be regulated by pivoting the subframe on the main frame in such a way as to raise or lower the flaps as desired. A typical spotting tractor includes a motor for a hydraulic cylinder for pivoting the subframe and such motor may be used to perform the further function of regulating the vertical height of the mud flaps.

Preferably, the upper ends of the mud flaps are pivotally connected to the subframe so as to allow the same to depend therefrom under the influence of gravity whereby a truly vertical orientation is achieved regardless of the angular relation of the subframe to the main frame.

Other objects and advantages will become apparent from the following specification taken in conjunction with the accompanying drawings.

DESCRIPTION OF THE PREFERRED EMBODIMENT

Described herein in the environment of a spotting tractor is the new and improved mud flap of the instant invention. However, it is to be understood that the principles of the invention that will be apparent from the following description of the exemplary embodiment may be applied to tractors other than spotting tractors and may be employed without resort to the specific structure typically found on spotting tractors. Therefore, the scope of the invention is not to be measured by the following description, but rather, by the appended claims.

Figure 1:
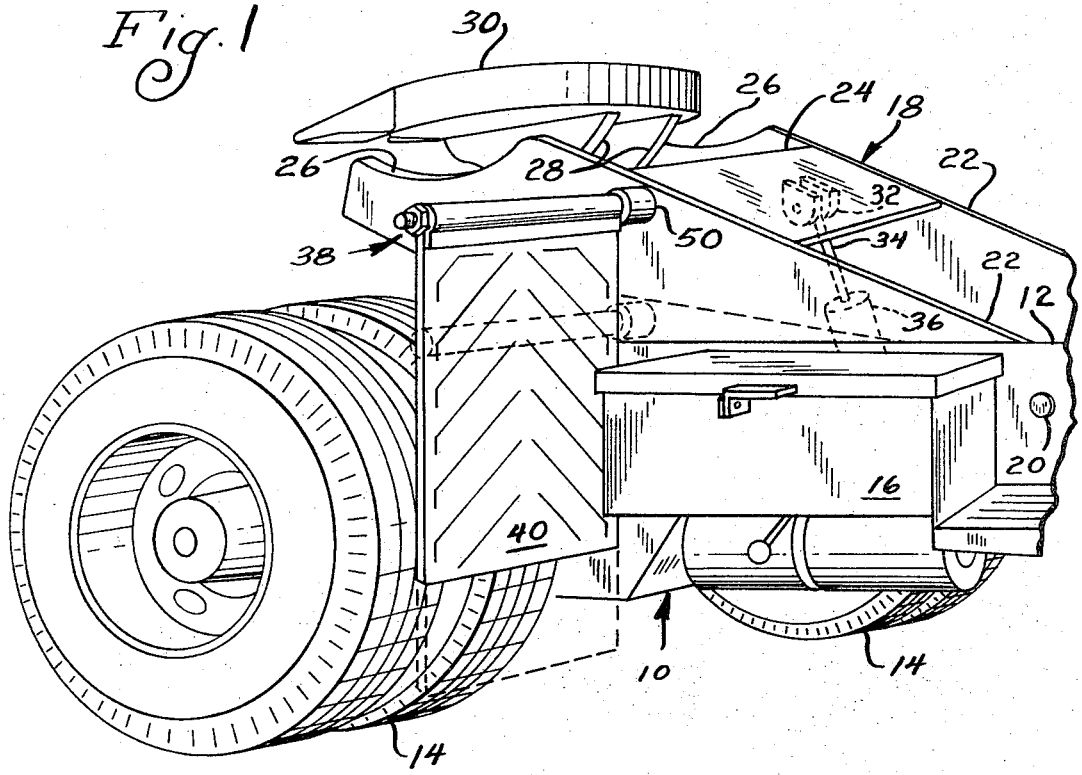
FIG. 1 is a partial, perspective view of the tractor embodying the invention.

Referring specifically to FIG. 1, a tractor embodying the invention is generally designated 10 and includes a main frame 12 of conventional construction and which, at its rear end, mounts drive wheels 14 driven by a motor (not shown) which in turn may be controlled by suitable conventional controls within a cab (also not shown). Secured to the frame may be a tool box 16. The frame 12 also mounts a subframe, generally designated 18, having its forward end pivotally connected as at 20 to the main frame 12. The subframe 18 includes side members 22 joined by a cross plate 24. The rear end of the subframe 18 is slightly relieved as at 26 and by a suitable connection (not shown) pivotally mounts depending tongues 28 affixed to the underside of a conventional fifth wheel 30 by which a trailer may be attached to the tractor 10.

Depending from the underside of the cross plate 24 is a lug 32 which is pivotally connected to the rod 34 of a hydraulic cylinder 36. The cylinder 36 is also pivotally connected to the main frame 12 in any conventional fashion and is operable when energized to pivot the subframe 18 about the pivot axis 20 for the purpose of raising or lowering the fifth wheel 30 for the usual purposes in connection with the use of the tractor 10 as a spotting tractor.

Extending from opposite sides of the subframe 18 are mud flap supports, generally designated 38, from which mud flaps 40 depend in a vertical orientation. The front to rear location of the supports 38 is such that the flaps 40 will be located just forwardly of the drive wheels 14.

It will be observed that since the point of connection of the mud flap supports 38 is spaced from the pivot 20 for the fifth wheel 30, the raising or lowering of the fifth wheel 30 by the cylinder 36 also changes the height of the flaps 40 relative to the wheels 14.

Figure 2:
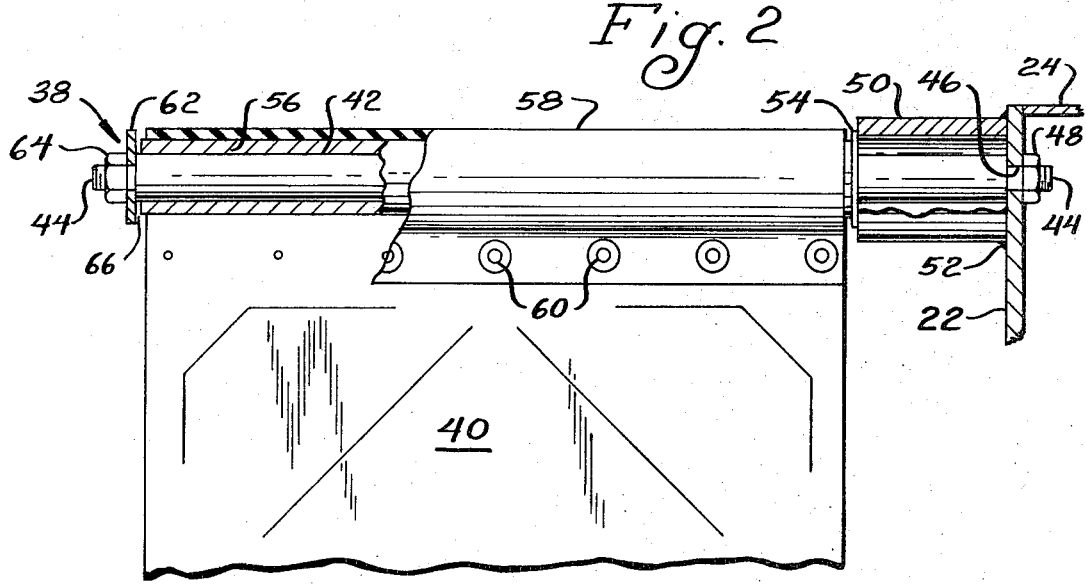
FIG. 2 is a fragmentary, side elevation of a mud flap mounting device employed in the invention with parts broken away for clarity.

Turning now to FIG. 2, the nature of the flap supports 36 may be seen in greater detail. Specifically, the flaps 40 are pivotally secured to the flap supports 38 so that under the influence of gravity they will assume a generally vertical position regardless of the orientation or angular relation of the subframe 18 to the main frame 12. One of the threaded ends 44 extends through an aperture 46 in the corresponding one of the side member 22 of the subframe 18 to receive a securing nut 48. For reinforcement purposes, the end of the rod 42 adjacent the nut 48 extends through a reinforcing sleeve 50 which may be secured to the corresponding side member 22 as by welds 52. Adjacent the sleeve 50 is a washer 54 which serves as an inexpensive thrust bearing.

Surrounding the major portion of the shaft 42 is an elongated sleeve 56 about which the upper end 58 of the flap 40 is passed to be secured to the remainder of the flap as by rivets 60. Normally, the arrangement is such that there will not be free rotation between the loop-like upper end 58 of the flap 40 and the sleeve 56, while free rotation will be permitted between the sleeve 56 and the shaft 42.

The assemblage is completed by a washer 62 and securing nut 64 on the opposite threaded end 44 of the shaft 42. Again, the washer 62 serves as an inexpensive thrust bearing and it is to be noted that preferably the length of the sleeve 56 is slightly less than that of the full diameter portion of the shaft 42 so that a slight gap 66 at either or both ends of the sleeve 56 exist to allow free rotation, as mentioned earlier.

In operation, when the tractor 10 is not pulling a trailer and it is desired to preclude mud from being flung forwardly by the wheels 14 towards the cab (not shown), the cylinder 36 may be appropriately energized to raise the flaps 40 to their highest position as shown in full lines in FIG. 1. It will be recognized that in such a position, not only the rear of the cab is protected, but other peripheral items such as the tool box 16 are shielded by the flaps 40.

On the other hand, when the tractor is in tow, the position of the fifth wheel 30 may be adjusted to any desired location. In such a case, both the underside of the trailer and the flaps 40 act in concert to minimize the amount of mud thrown forwardly by the drive wheels 14. In this respect, by mounting the upper ends of the flaps 40 relative to the fifth wheel 30, such that a minimum of space will exist between the underside of the tractor received on the fifth wheel 30 and the upper end of the flaps 40, the mud problem can be virtually entirely eliminated.

And, while the invention has been described in connection with a vertically adjustable fifth wheel having a drive motor in the form of the cylinder 36 by which vertical adjustment can be achieved, it will be recognized that the principles of the invention could be employed without such structure simply by the provision of elements intended solely for providing vertical adjustment of the mud flaps independently of the fifth wheel 30.

I claim:

1. In a prime mover including a main vehicle frame having a forward end and a rearward end, drive wheels secured to the frame adjacent the rear end thereof, a fifth wheel adjacent the rear end thereof and means mounting the fifth wheel on the frame for up and down movement thereon, the improvement comprising: a pair of generally vertically oriented mud flaps just forwardly of said rear wheels and secured to said fifth wheel mounting means on opposite sides of said fifth wheel for up and down movement therewith whereby when said prime mover is not towing a trailer, said fifth wheel may be elevated to elevate said mud flaps to preclude mud from being thrown forwardly by said drive wheels.

2. The invention of claim 1 wherein said mounting means comprises a mounting frame mounting at one end said fifth wheel and at its other being pivotally connected to said vehicle frame; and said mud flaps are secured to said mounting frame rearwardly of its pivotal connection to said vehicle frame and forwardly of said drive wheels.

3. The invention of claim 2 wherein said mud flaps are mounted on said mounting frame by pivotal connections establishing a generally horizontal pivot axis whereby said mud flaps may assume a generally vertical position regardless of the position of said mounting frame relative to said vehicle frame.

4. The invention of claim 3 wherein said pivotal connections between said mounting frame and said mud flaps are at the uppermost ends of said mud flaps.

5. The invention of claim 3 wherein each said pivotal connection includes a sidewardly extending, elongated rod having one end secured to said mounting frame.

6. In a prime mover including a main vehicle frame having a forward end and a rearward end, drive wheels secured to the frame adjacent the rear end thereof, a fifth wheel adjacent the rear end thereof and means mounting the fifth wheel on the frame for up and down movement thereon, the improvement comprising: a pair of generally vertically oriented mud flaps just forwardly of said rear wheels and secured on opposite sides of said fifth wheel for up and down movement therewith, said mud flaps being secured to said fifth wheel by pivotal connections establishing a generally horizontal pivot axis, whereby when said prime mover is not towing a trailer, said fifth wheel may be elevated to elevate said mud flaps to preclude mud from being thrown forwardly by said drive wheels, and whereby said mud flaps may assume a generally vertical position regardless of the position of said fifth wheel relative to said vehicle frame.

* * * * *